(12) United States Patent
Lee et al.

(10) Patent No.: US 8,760,754 B2
(45) Date of Patent: Jun. 24, 2014

(54) WAVELENGTH-TUNABLE LASER SYSTEM

(75) Inventors: Yong Tak Lee, Gwangju-Si (KR); Feng Xiao, Joondalup (AU); Kamal Alameh, Joondalup (AU)

(73) Assignee: Ytel Photonics Inc., Gwangiu-Si (KR)

( * ) Notice: Subject to any disclaimer, the term of this patent is extended or adjusted under 35 U.S.C. 154(b) by 373 days.

(21) Appl. No.: 13/384,735

(22) PCT Filed: Jun. 4, 2010

(86) PCT No.: PCT/KR2010/003595
§ 371 (c)(1),
(2), (4) Date: Jan. 18, 2012

(87) PCT Pub. No.: WO2011/010791
PCT Pub. Date: Jan. 27, 2011

(65) Prior Publication Data
US 2012/0120466 A1    May 17, 2012

(30) Foreign Application Priority Data
Jul. 23, 2009 (KR) .......... 10-2009-0067388

(51) Int. Cl.
*H01S 3/086* (2006.01)
*H01S 3/067* (2006.01)
*H01S 3/08* (2006.01)

(52) U.S. Cl.
CPC ............. *H01S 3/086* (2013.01); *H01S 3/08059* (2013.01); *H01S 3/08009* (2013.01); *H01S 3/0675* (2013.01); *H01S 3/06766* (2013.01)
USPC ............... 359/337.1; 359/346; 372/29.016; 372/99; 372/6

(58) Field of Classification Search
USPC ................................................. 359/333, 346
See application file for complete search history.

(56) References Cited

U.S. PATENT DOCUMENTS

| | | | | |
|---|---|---|---|---|
| 3,466,110 A * | 9/1969 | Pole et al. | ......................... | 359/32 |
| 3,533,674 A * | 10/1970 | Brooks et al. | ..................... | 359/4 |
| 3,675,990 A * | 7/1972 | Werner et al. | ..................... | 359/885 |
| 3,943,457 A * | 3/1976 | Lehmberg | ..................... | 359/333 |
| 5,305,402 A * | 4/1994 | Hill et al. | ......................... | 385/25 |
| 5,537,432 A * | 7/1996 | Mehuys et al. | ............. | 372/50.11 |
| 5,566,199 A * | 10/1996 | Kepros | ......................... | 372/103 |
| 5,651,018 A * | 7/1997 | Mehuys et al. | .............. | 372/50.1 |
| 5,684,611 A * | 11/1997 | Rakuljic et al. | ..................... | 359/7 |
| 5,784,507 A * | 7/1998 | Holm-Kennedy et al. | ..... | 385/31 |

(Continued)

FOREIGN PATENT DOCUMENTS

KR   10-2009-0079397 A   7/2009

OTHER PUBLICATIONS

International Search Report issued in PCT/KR2010/003595, with translation, 4 pages.

*Primary Examiner* — Mark Hellner
*Assistant Examiner* — Ari M Diacou
(74) *Attorney, Agent, or Firm* — Osha Liang LLP

(57) ABSTRACT

A wavelength-tunable laser system includes an optical fiber collimator array having at least two ports, an optical amplifier connected to one port of an optical fiber, an optical coupler for coupling light incident from the optical amplifier and transmitting the coupled light to another port, a diffraction grating plate for guiding each wavelength component of light incident from the optical fiber collimator array in a different direction, and an Opto-Very Large Scale Integration (Opto-VLSI) processor.

17 Claims, 17 Drawing Sheets

(56) References Cited

U.S. PATENT DOCUMENTS

| | | | |
|---|---|---|---|
| 5,847,863 A * | 12/1998 | Galvanauskas et al. | 359/341.3 |
| 6,141,361 A * | 10/2000 | Mears et al. | 372/20 |
| 6,526,076 B2 * | 2/2003 | Cham et al. | 372/29.011 |
| 6,657,775 B1 * | 12/2003 | Farmer et al. | 359/334 |
| 6,665,471 B1 * | 12/2003 | Farmer et al. | 385/37 |
| 6,674,782 B2 * | 1/2004 | Roosen et al. | 372/94 |
| 6,810,165 B2 * | 10/2004 | Golub et al. | 385/18 |
| 6,885,791 B2 * | 4/2005 | Xie et al. | 385/37 |
| 6,956,680 B2 * | 10/2005 | Morbieu et al. | 359/15 |
| 7,139,116 B1 * | 11/2006 | Vaissie et al. | 359/333 |
| 7,450,618 B2 * | 11/2008 | Dantus et al. | 372/25 |
| 7,889,348 B2 * | 2/2011 | Tearney et al. | 356/451 |
| 7,903,326 B2 * | 3/2011 | Gaudiosi et al. | 359/333 |
| 8,189,971 B1 * | 5/2012 | Vaissie et al. | 385/37 |
| 8,300,669 B2 * | 10/2012 | Dantus et al. | 372/25 |
| 2001/0050787 A1 * | 12/2001 | Crossland et al. | 359/15 |
| 2002/0006150 A1 * | 1/2002 | Roosen et al. | 372/94 |
| 2002/0075911 A1 * | 6/2002 | Cham et al. | 372/29.011 |
| 2003/0002097 A1 * | 1/2003 | Morbieu et al. | 359/15 |
| 2003/0063831 A1 * | 4/2003 | Xie et al. | 385/10 |
| 2004/0240037 A1 * | 12/2004 | Harter | 359/333 |
| 2004/0263950 A1 * | 12/2004 | Fermann et al. | 359/333 |
| 2006/0193352 A1 | 8/2006 | Chong et al. | |
| 2007/0041082 A1 * | 2/2007 | Bullington et al. | 359/333 |
| 2007/0064304 A1 * | 3/2007 | Brennan et al. | 359/333 |
| 2008/0043789 A1 * | 2/2008 | Moro et al. | 372/25 |
| 2008/0144139 A1 * | 6/2008 | Yeo | 358/509 |
| 2009/0238217 A1 * | 9/2009 | Moser et al. | 372/20 |
| 2011/0249692 A1 * | 10/2011 | Honea et al. | 372/29.011 |
| 2012/0045169 A1 * | 2/2012 | Hu et al. | 385/33 |
| 2012/0127549 A1 * | 5/2012 | Lee | 359/9 |

\* cited by examiner

WAVELENGTH-TUNABLE LASER SYSTEM

CROSS-REFERENCE TO RELATED APPLICATION

This application claims priority to and the benefit of Korean Patent Application No. 2009-0067388, filed on Jul. 23, 2009, the disclosure of which is incorporated herein by reference in its entirety.

BACKGROUND

1. Field of the Invention

The present invention relates to a wavelength-tunable laser system, and more particularly, to a wavelength-tunable single-mode laser system using an Opto-Very Large Scale Integration (Opto-VLSI) processor.

2. Discussion of Related Art

Many studies have been conducted to apply single-mode lasers to optical communication. In particular, erbium-doped lasers have a broad light emission spectrum and a uniformly broad gain, and hence have a high Side-Mode Suppression Ratio (SMSR). However, optical fiber ring lasers may exhibit multimode oscillation, mode competition, and mode hopping phenomena due to a long cavity length, and hence, wavelength tuning may be inaccurate.

A few wavelength-tunable single-mode laser systems have been reported. For example, wavelength-tunable single-mode laser systems using an optical fiber Bragg grating, a Fabry-Perot filter, and an etalon filter have been reported. However, the wavelength-tunable single-mode laser system using the optical fiber Bragg grating is sensitive to changes in a peripheral environment. For the wavelength-tunable single-mode laser system using the optical fiber Bragg grating, high packaging cost is required and a wavelength-tunable band is limited. Because the wavelength-tunable single-mode laser systems using the Fabry-Perot filter require an additional element such as the Fabry-Perot filter, the structure becomes complex and manufacturing cost becomes high.

SUMMARY OF THE INVENTION

Embodiments of the present invention are directed to a wavelength-tunable laser system that can be manufactured in a small size and perform wavelength tuning with high precision by emitting only light of a specific wavelength through an Opto-VLSI processor.

According to one or more embodiments of the present invention, there is provided a wavelength-tunable laser system, including: an optical fiber collimator array having at least two ports; an optical amplifier connected to one port of the optical fiber collimator array; an optical coupler for coupling light incident from the optical amplifier and transmitting the coupled light to another port; a diffraction grating plate for guiding each wavelength component of light incident from the optical fiber collimator array in a different direction; and an Opto-VLSI processor.

According to one or more embodiments of the present invention, the wavelength-tunable laser system may further include: a polarization controller provided between the other port and the optical coupler. According to one or more embodiments of the present invention, a lens may be further provided between the optical fiber collimator array and the diffraction grating plate and/or between the diffraction grating plate and the Opto-VLSI processor.

According to one or more embodiments of the present invention, there is provided a wavelength-tunable laser system, including: an optical fiber collimator array having at least one port; an optical amplifier connected to one port of the optical fiber collimator array; an optical coupler for coupling and retransmitting light incident from the optical amplifier; an optical circulator for transferring light incident from the optical fiber collimator array to the optical amplifier and transferring light from the optical coupler to the optical fiber collimator array; a diffraction grating plate for guiding each wavelength component of the light incident from the optical fiber collimator array in a different direction; and an Opto-VLSI processor.

According to one or more embodiments of the present invention, the wavelength-tunable laser system may further include: a first lens provided between the optical fiber collimator array and the diffraction grating plate; and a second lens provided between the diffraction grating plate and the Opto-VLSI processor.

According to one or more embodiments of the present invention, a semiconductor optical amplifier (SOA) using a semiconductor medium or a rare earth element-doped fiber amplifier such as an Erbium-Doped Fiber Amplifier (EDFA) may be used as the optical amplifier.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF INVENTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

First Exemplary Embodiment

Figure 1:
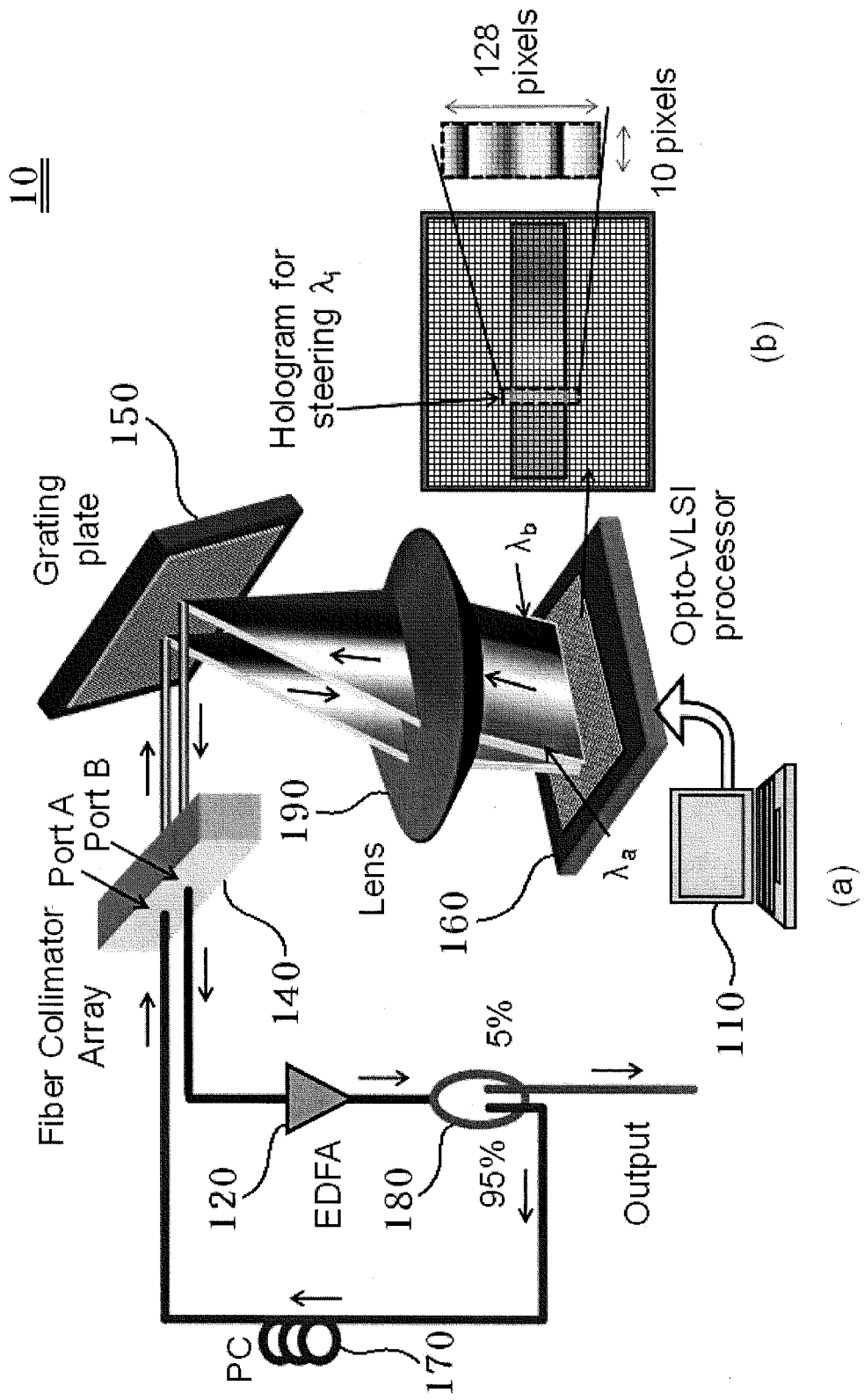
FIG. 1 is a schematic configuration diagram of a wavelength-tunable laser system according to a first exemplary embodiment of the present invention.

FIG. 1 is a schematic configuration diagram of a wavelength-tunable laser system according to a first exemplary embodiment of the present invention.

Referring to FIG. 1, the wavelength-tunable laser system 10 includes an optical spectrum analyzer 110, a polarization controller (PC) 170, an optical amplifier 120, an optical coupler 180, an optical fiber collimator array 140, a diffraction grating plate 150, an Opto-VLSI processor 160, and a lens 190. The PC 170 and the lens 190 may be excluded, if necessary.

According to one or more embodiments of the present invention, the optical fiber collimator array 140 has at least two ports (ports A and B) and be manufactured as the optical fiber collimator array. The PC 170 may be connected to one port (port A), and the optical amplifier 120 may be connected to another port (port B). The PC 170 and the optical amplifier 120 are connected to the optical coupler 180. For example, the optical coupler 180 may have a ratio of 5:95, and couples light incident from the optical amplifier 120 to transfer the coupled light to the one port (port A) and outputs the remaining power to the outside. However, a coupling ratio of the optical coupler 180 is not limited thereto, and, of course, may be variously modified.

An SOA using a semiconductor medium, a rare earth element-doped fiber amplifier such as an EDFA, or the like may be used as the optical amplifier 120, Referring to FIG. 1, 95% of a broadband ASE spectrum initially generated by the optical amplifier 120 is routed to the Opto-VLSI processor 160 through the one port (port A) of the optical fiber collimator array 140. The PC 170 is used to align the ASE polarization so that the dispersion efficiency of the Opto-VLSI processor is maximized, and also to enforce a single-polarization laser operation. The diffraction grating plate 150 demultiplexes a collimated broadband ASE signal along different directions.

On the other hand, in this structure, a lens may be further provided between the optical fiber collimator array 140 and the diffraction grating plate 150 and/or between the (optical) diffraction grating plate 150 and the Opto-VLSI processor 160. In FIG. 1, an example in which the lens is provided between the (optical) diffraction grating plate 150 and the Opto-VLSI processor 160 is illustrated.

The lens provided between the diffraction grating plate 150 and the Opto-VLSI processor 160 may have a focal length of 10 cm and be placed at 10 cm from the diffraction grating plate 150 so that the dispersed ASE wavebands are deflected along the same direction and mapped onto the surface of the Opto-VLSI processor 160.

On the other hand, light of a specific wavelength passing through the optical fiber collimator array 140 is amplified by the optical amplifier 120 and emitted to the outside through a circulation operation. Accordingly, it is possible to perform wavelength tuning by emitting only light of a desired wavelength.

The Opto-VLSI processor 160 is used to feed back only light of a specific wavelength among guided wavelength components to the optical amplifier 120. A function of feeding back the light of the specific wavelength may be performed by applying an electric current through a data decoder and an address decoder to form a desired hologram pattern.

That is, by driving the Opto-VLSI processor 160 with a steering phase hologram, any waveband of ASE spectra can be routed to or coupled into the port B of the optical fiber collimator array 140.

Selected wavebands coupled into the port B are amplified by the optical amplifier 120 (for example, an EDFA), leading, after several re-circulations, to single-mode laser generation. Therefore, the laser system can be tuned by simply uploading appropriate phase holograms that drive various pixels of the Opto-VLSI processor 160.

The inventors have demonstrated that the capability of the Opto-VLSI-based tunable laser system shown in FIG. 1 for adjusting an output laser wavelength without moving and heating components is sufficiently reliable for commercialization.

In the Opto-VLSI processor 160, for example, an aluminum minor, a Quarter Wave Plate (QWP), a Liquid Crystal (LC) material, Indium Tin Oxide (ITO), and glass are sequentially stacked on a silicon substrate, and a desired hologram pattern can be formed by applying an electric current through a data decoder and an address decoder.

If light is applied to the Opto-VLSI processor 160 configured as described above, the light is diffracted by a hologram pattern formed on the Opto-VLSI processor 160 and an angle of light is determined by $\theta=\lambda(q \times d)$. Here, $\lambda$ denotes a wavelength of incident light, q denotes the number of pixels per unit interval, and d denotes a pixel size (diameter).

More specifically, the Opto-VLSI processor 160 generates digital holographic diffraction gratings to steer and/or shape optical beams. Each pixel is assigned a predetermined memory element that stores a digital value, and a multiplexer that selects a specific input voltage value or applies the selected voltage value to an aluminum mirror plate.

The Opto-VLSI processor 160 connected to the personal computer 110 or the like is electronically controlled, software-configured, polarization independent, cost effective because of the high-volume manufacturing capability of VLSI chips as well as the capability of simultaneously controlling a plurality of optical beams, and very reliable because beam steering is achieved with no mechanically moving parts. Because of this point, the Opto-VLSI technology is receiving attention as technology for a reconfigurable optical network.

In the Opto-VLSI processor 160 according to one or more embodiments of the present invention, for example, the ITO is used as a transparent electrode, and the aluminum mirror is used as a reflective electrode. By incorporating a thin QWP between the LC and the VLSI backplane, a polarization-insensitive Opto-VLSI processor can be realized. The ITO layer is generally grounded and a voltage is applied at the reflective electrode by a VLSI circuit below the LC material. This is to generate step-by-step blazed gratings for optical beam steering.

On the other hand, the steering performance of the Opto-VLSI processor having the pixel size d is shown. It is driven by blazed gratings according to a phase hologram.

If a pitch of the blazed grating is q×d (where q is the number of pixels per pitch), an optical beam is steered at the angle θ proportional to the wavelength λ of light and inversely proportional to q×d. A blazed grating of arbitrary pitch can be generated, for example, using MATLAB or LabVIEW software, by changing a voltage applied to each pixel and digitally driving a block of pixels with appropriate phase levels. An incident optical beam can be dynamically emitted along an arbitrary direction.

EXPERIMENTAL EXAMPLES

The wavelength-tunable laser system of the exemplary embodiment of the present invention of FIG. 1 was demonstrated through actual experiments. In the experiments, the EDFA was a C-band amplifier having a gain spectrum shown in FIG. 2, and a 256-phase-level 512×512-pixel Opto-VLSI processor of pixel size 15 µm was used. A spacing between the optical fiber collimator elements (the ports A and B) was 3 mm, and the optical spectrum analyzer with 0.01 nm resolution was used to monitor the laser output power generated at the 5% output port of the optical coupler (FIG. 1).

The ASE signal was collimated at 0.5 mm diameter, and a reflective grating plate, having 1200 lines/mm and a reflection angle of 70° at 1530 nm, was used to demultiplex the ASE signal and map onto an active window of the Opto-VLSI processor through a lens with a focal length of 10 cm placed 10 cm from the grating plate. The LabVIEW software was developed to generate the optimized digital holograms that steer the desired waveband and couple into the collimator port B.

Figure 2:
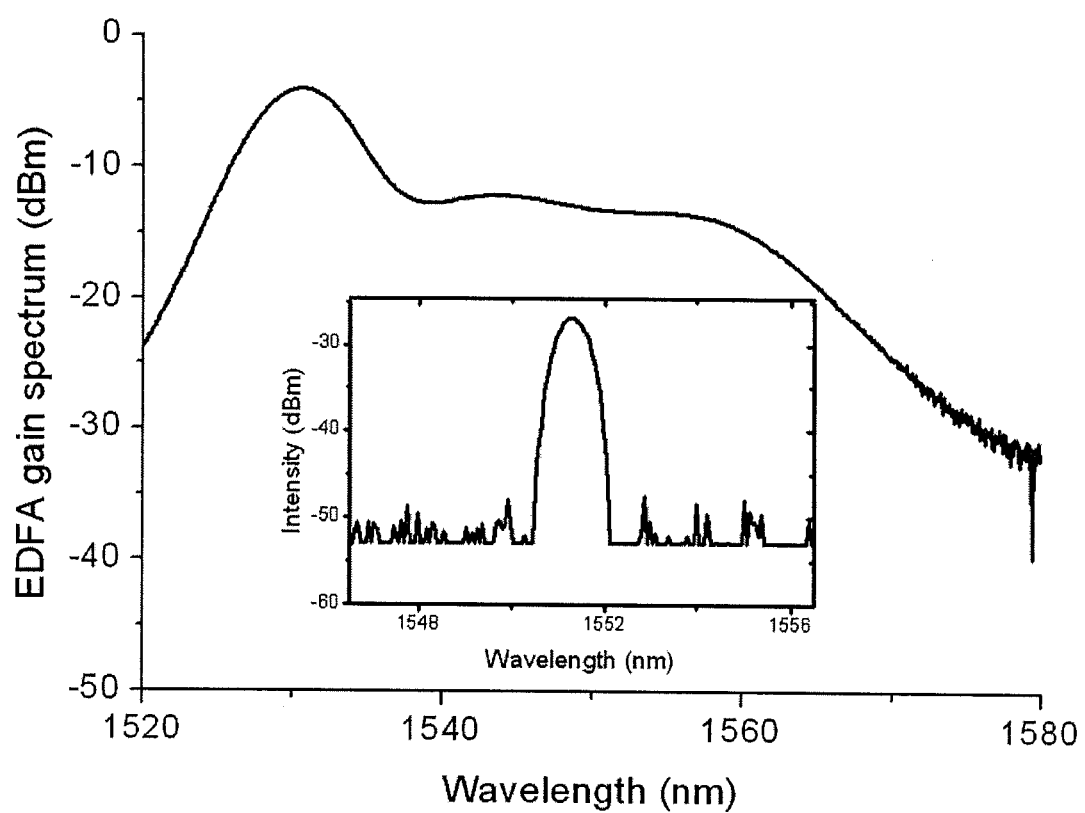
FIG. 2 shows Amplified Spontaneous Emission (ASE) noise from an EDFA according to an experimental example of one or more embodiments of the present invention, wherein the inset shows an example of a waveband selected by an Opto-VLSI processor.

FIG. 2 shows ASE noise from an EDFA according to an experimental example of one or more embodiments of the present invention, wherein the inset shows an example of a waveband selected by an Opto-VLSI processor.

Referring to FIG. 2, when an optical loop was open, several important parameters were measured. The ASE signal of the EDFA is shown in FIG. 2. A gain spectrum of the EDFA was linearly mapped along the active window of the Opto-VLSI processor. The inset of FIG. 2 is an example that illustrates the selection and coupling of an arbitrary waveband into the port B by uploading a phase hologram onto the Opto-VLSI processor. A measured total insertion loss from the port A to the port B was around 12 dB, which was mainly due to (i) lens reflection loss; (ii) reflective grating loss; and (iii) diffraction loss and insertion loss of the Opto-VLSI processor.

After the optical loop was closed, the Opto-VLSI processor was driven by different phase holograms, each corresponding to single-mode lasing at a specific wavelength. Each selected waveband experienced a high gain by the EDFA in comparison to gains experienced by the other ASE wavebands.

Figure 3:
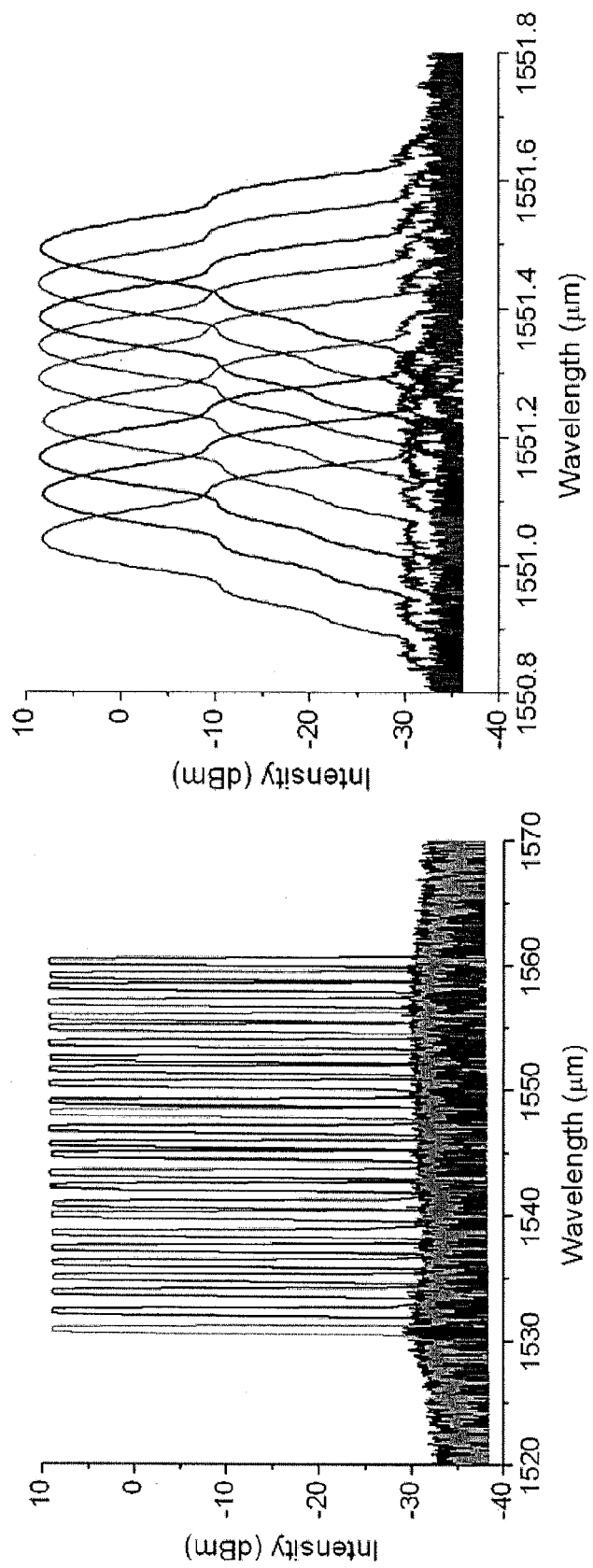
FIG. 3 shows measured outputs of an Opto-VLSI-based laser system according to an experimental example of one or more embodiments of the present invention.

FIG. 3 shows measured outputs of an Opto-VLSI-based laser system according to an experimental example of one or more embodiments of the present invention. The left drawing of FIG. 3 shows the measured laser outputs when coarse wavelength tuning over the C-band was performed, and the right drawing of FIG. 3 shows the measured laser outputs when fine wavelength tuning was performed by shifting the center of the phase hologram by a single pixel across the active window of the Opto-VLSI processor.

The left drawing of FIG. 3 shows the measured outputs of the Opto-VLSI-based laser system, and demonstrates an excellent tuning capability over the C-band through the generation of 8×512 phase holograms at different positions along the active window of the Opto-VLSI processor. A measured SMSR was greater than 35 dB and an output power ripple was less than 0.25 dB over the entire C-band.

A wavelength tuning step was around 0.05 nm. This corresponds to the mapping of 30 nm bandwidth of ASE spectrum of the EDFA across the 512 pixels (each having a size of 15 µm). Note that a tuning resolution can be made smaller by using an Opto-VLSI processor with a smaller pixel size.

A measured crosstalk between the port A and the port B, defined as the ratio of the unselected ASE signal to the power of the waveband selected by the Opto-VLSI processor, was less than −55 dB. This crosstalk level can further be reduced by (i) increasing the spacing between the port A and the port B, (ii) improving the imaging quality of the lens, (iii) increasing the collimated beam diameter, and (iv) reducing the pixel size of the Opto-VLSI processor.

The above-described tunable laser system adopts the reconfigurable Opto-VLSI for wavelength selection, the EDFA as a gain medium, the grating plate for demultiplexing a wavelength, and the optical device for mapping an optical beam. As experimental results, the above-described tunable laser system has a wavelength tuning resolution of an SMSR of about 35 dB, an output power uniformity of 0.25 dB over the whole C-band, a laser linewidth as narrow as 0.05 nm, and excellent stability at room temperature.

Second Exemplary Embodiment

Figure 4:
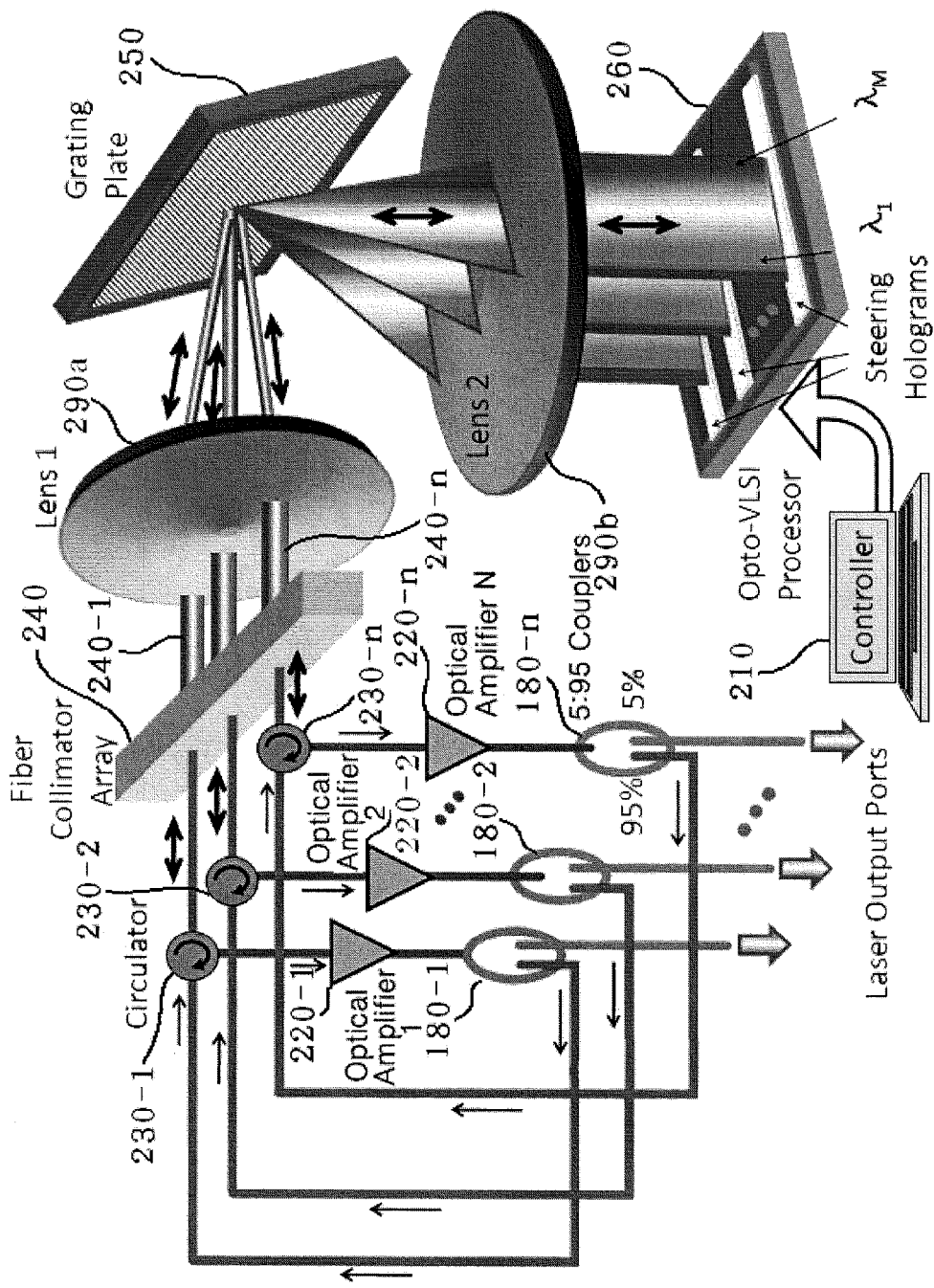
FIG. 4 is a schematic configuration diagram showing a wavelength-tunable laser system according to a second exemplary embodiment of the present invention.

FIG. 4 is a schematic configuration diagram showing a wavelength-tunable laser system according to a second exemplary embodiment of the present invention. In the second exemplary embodiment, components different from those of the first exemplary embodiment will be mainly described. The description of the same components should be substituted with that of the first exemplary embodiment.

Referring to FIG. 4, the wavelength-tunable laser system includes an optical spectrum analyzer 210, optical amplifiers 220-1, . . . , 220-n, optical couplers 180-1, . . . , 180-n, an optical fiber collimator array 240, a diffraction grating plate 250, and an Opto-VLSI processor 260.

According to this exemplary embodiment, optical circulators 230-1, . . . , 230-n are disposed in correspondence with ports 240-1, . . . , 240-n of the optical fiber collimator array 240, and the optical circulators 230-1, . . . , 230-n are respectively connected to the optical amplifiers 220-1, . . . , 220-n. Each of the optical circulators 230-1, . . . , 230-n is provided to transfer light to a fixed path by circulating the light through one path (see a path indicated in FIG. 4).

According to the second exemplary embodiment, it is possible to implement a more compact structure because the ports 240-1, . . . , 240-n of the optical fiber collimator array 240 are respectively configured to transfer light in two ways.

Likewise, in this exemplary embodiment, a lens may be further provided between the optical fiber collimator array 240 and the diffraction grating plate 250 and/or between the (optical) diffraction grating plate 250 and the Opto-VLSI processor 260. FIG. 4 shows an example in which lenses 290a and 290b are provided between the optical fiber collimator array 240 and the diffraction grating plate 250 and between the diffraction grating plate 250 and the Opto-VLSI processor 260.

Figure 5:
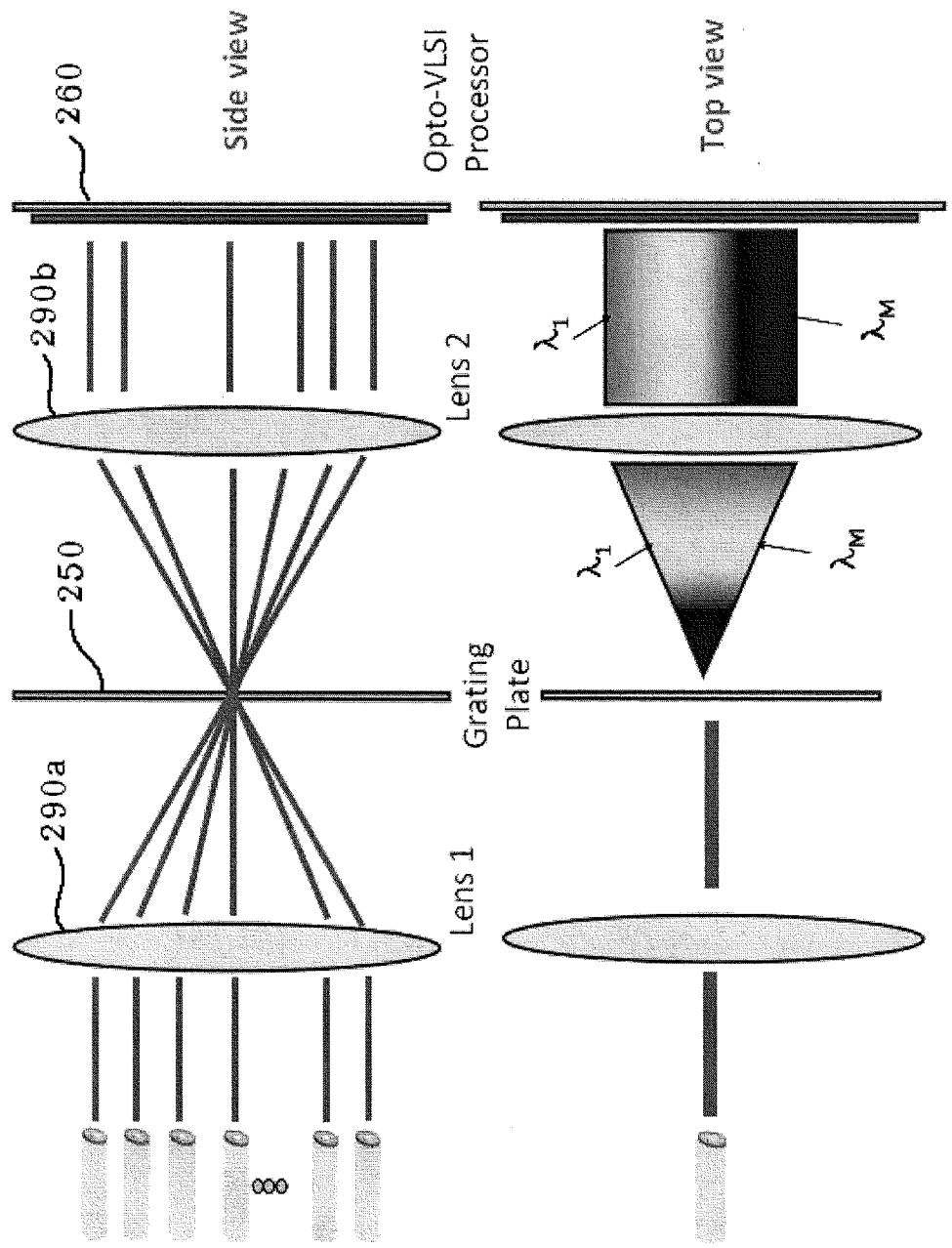
FIGS. 5 to 7 are side and top views illustrating an operation of the wavelength-tunable laser system according to the second exemplary embodiment of the present invention.
Figure 6:
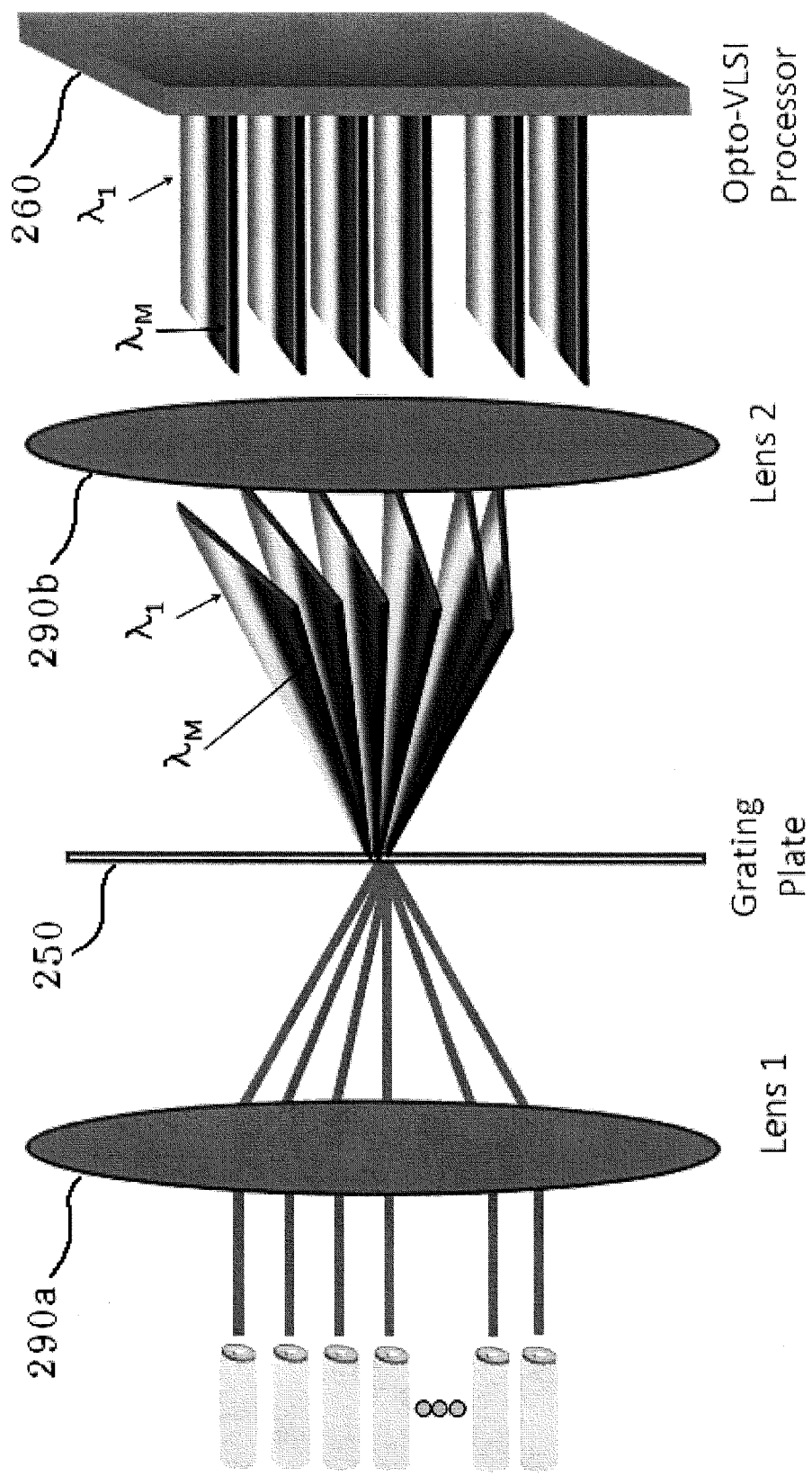
Figure 7:
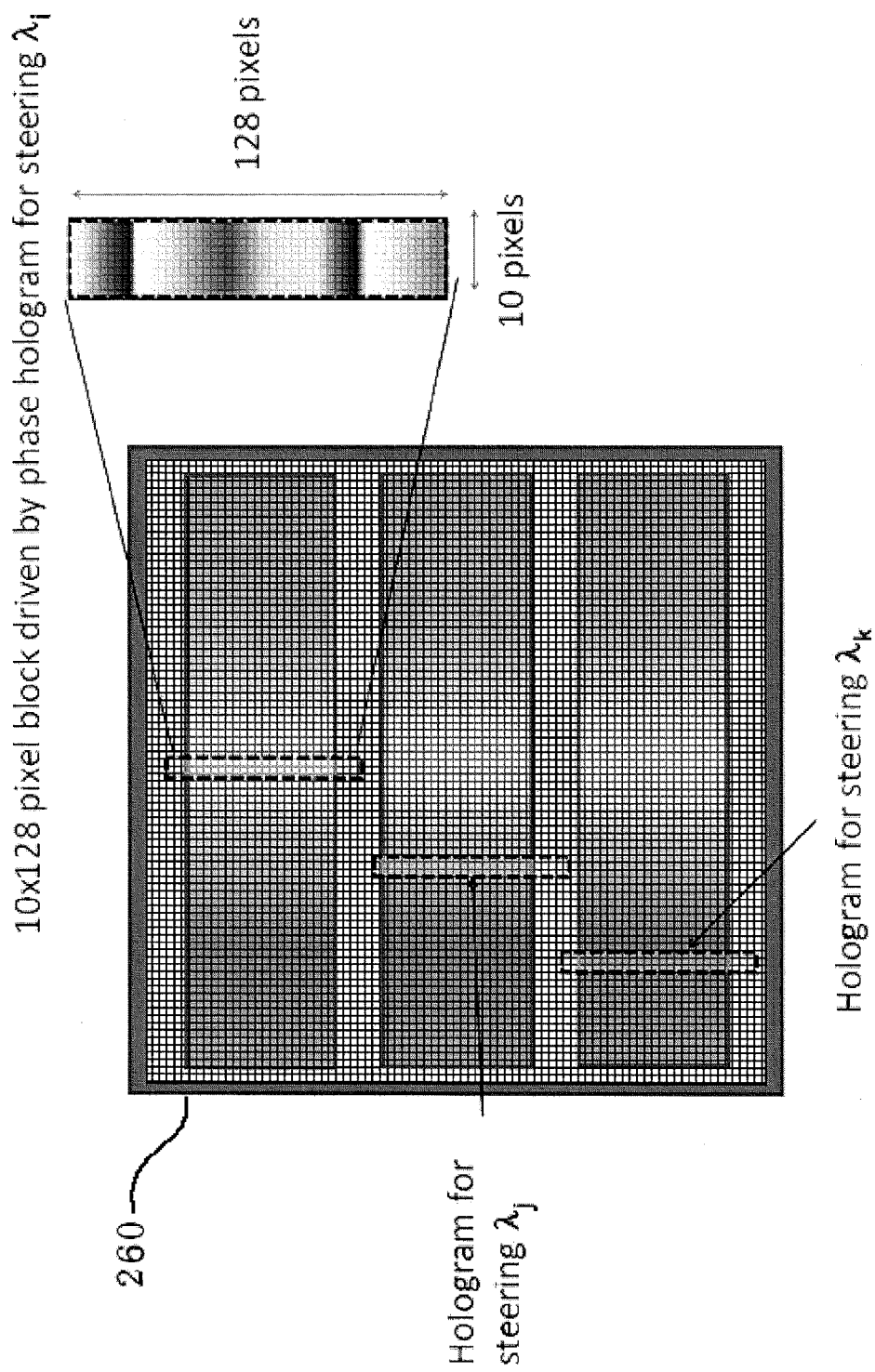

FIGS. 5 to 7 are side and top views illustrating an operation of the wavelength-tunable laser system according to the second exemplary embodiment of the present invention.

Referring to FIGS. 5 to 7, light from the ports 240-1, . . . , 240-n of the optical fiber collimator array 240 is focused on the diffraction grating plate 250 by the first lens 290a. Here, the light is separated according to wavelengths 1, . . . , M and transferred to the Opto-VLSI processor 260. The light transferred to the Opto-VLSI processor 260 is used to feed back only light of a specific wavelength among wavelength components guided according to each band to the optical amplifier. A function of feeding back the light of the specific wavelength may be performed by applying an electric current through a data decoder and an address decoder to form a desired hologram pattern.

Third Exemplary Embodiment

Figure 8:
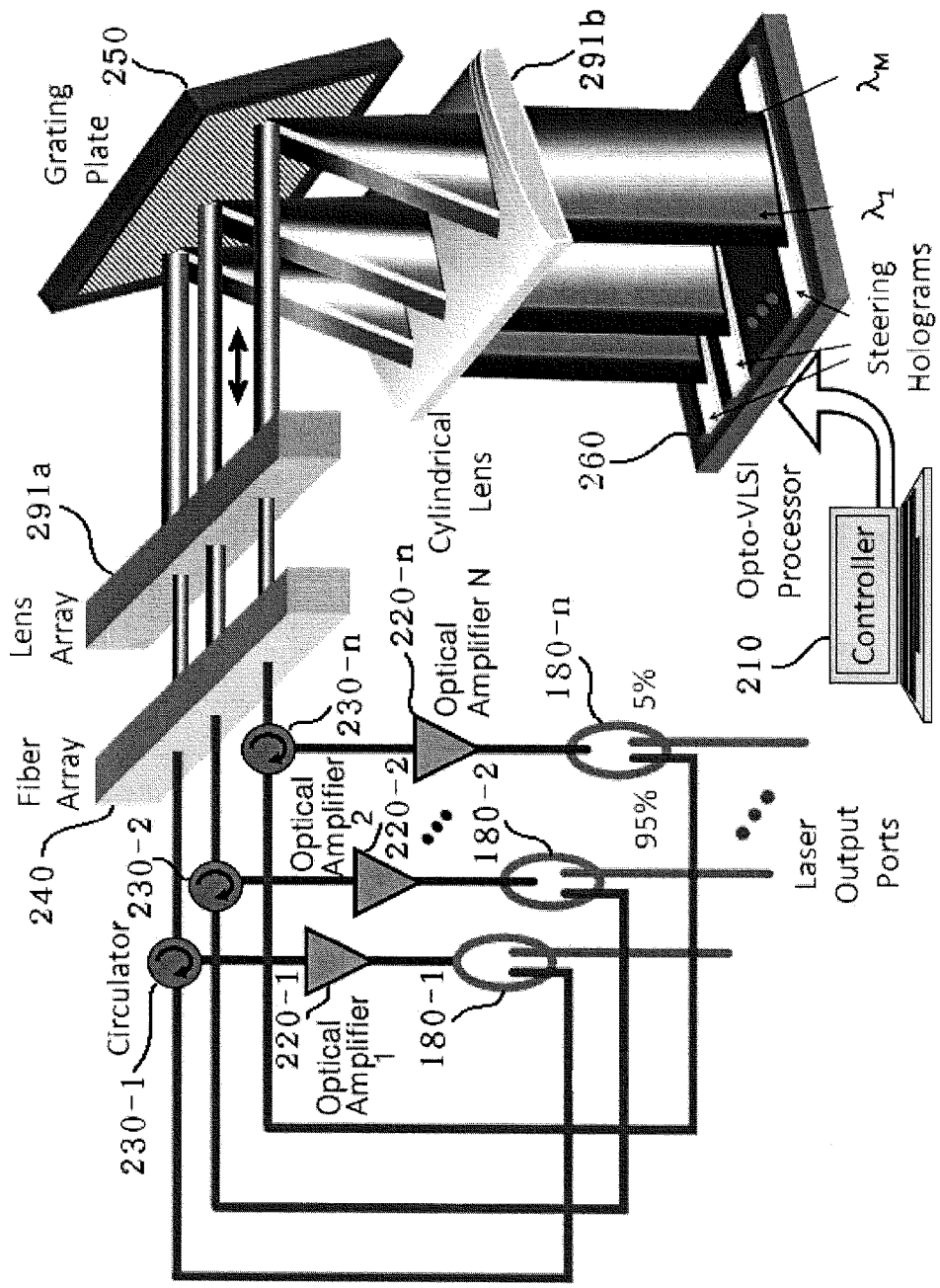
FIG. 8 is a schematic configuration diagram showing a wavelength-tunable laser system according to a third exemplary embodiment of the present invention.

FIG. 8 is a schematic configuration diagram showing a wavelength-tunable laser system according to a third exemplary embodiment of the present invention. In the third exemplary embodiment, components different from those of the second exemplary embodiment will be mainly described. The description of the same components should be substituted with that of the first exemplary embodiment.

Referring to FIG. 8, the wavelength-tunable laser system includes an optical spectrum analyzer 210, optical amplifiers 220-1, . . . , 220-n, optical couplers 180-1, . . . , 180-n, an optical fiber collimator array 240, a diffraction grating plate 250, and an Opto-VLSI processor 260. According to this exemplary embodiment, optical circulators 230-1, . . . , 230-n are disposed in correspondence with ports 240-1, . . . , 240-n, and the optical circulators 230-1, . . . , 230-n are respectively connected to the optical amplifiers 220-1, . . . , 220-n.

A lens may be further provided between the optical fiber collimator array 240 and the diffraction grating plate 250 and/or between the (optical) diffraction grating plate 250 and the Opto-VLSI processor 260.

Figure 9:
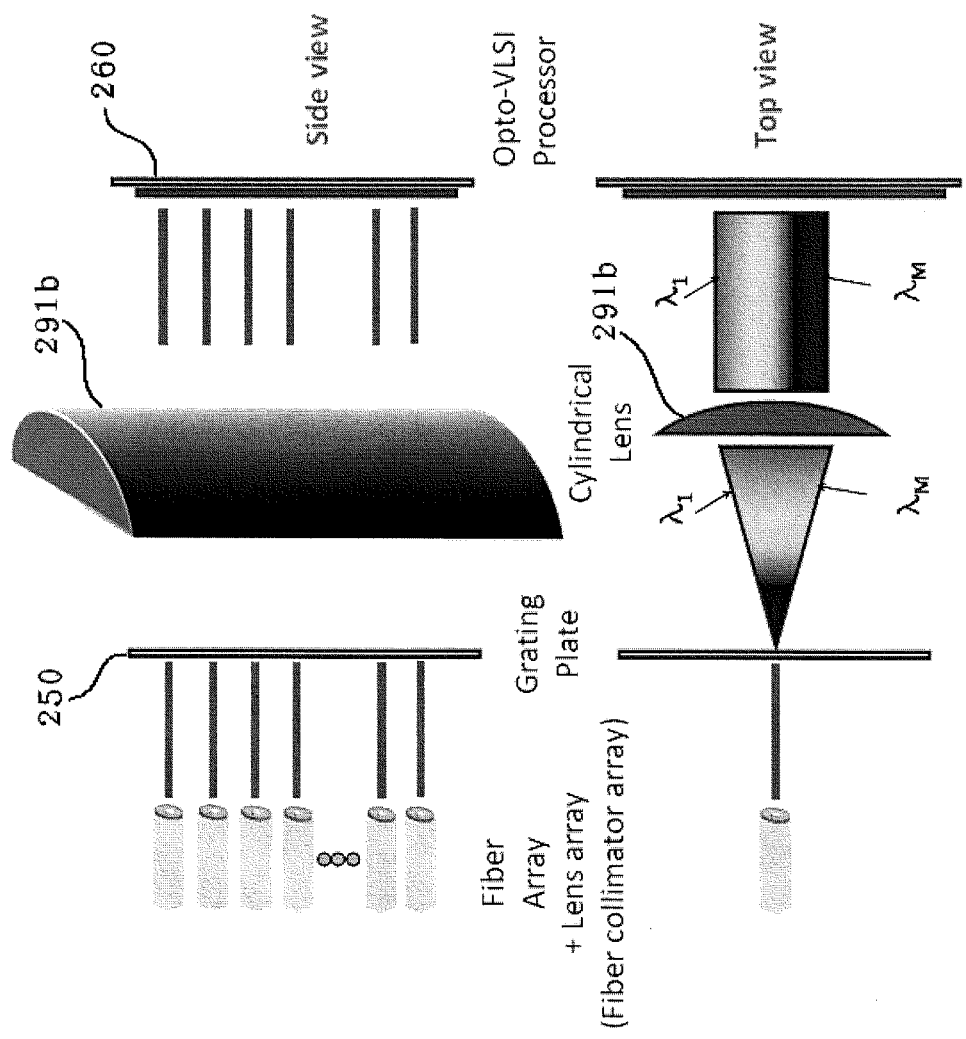
FIGS. 9 and 10 are side and top views illustrating an operation of the wavelength-tunable laser system according to the third exemplary embodiment of the present invention.
Figure 10:
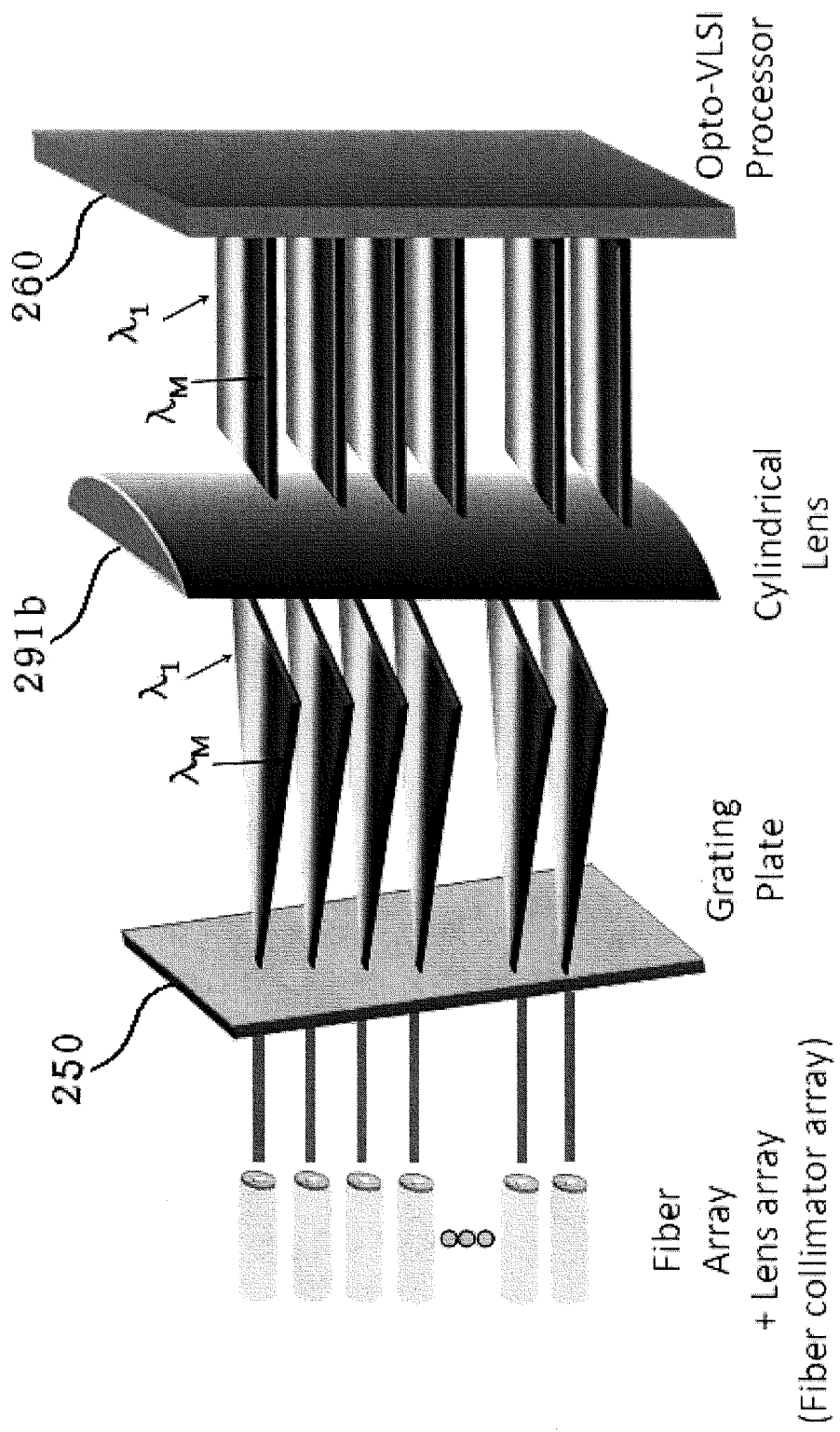

In this case, while a lens 291a of an optical fiber collimator array-like structure is provided between the optical fiber collimator array and the diffraction grating plate in correspondence with each port of the optical fiber collimator array, a lens 291b of an integrated cylindrical structure is provided between the (optical) diffraction grating plate and the Opto-VLSI processor. FIGS. 9 and 10 are side and top views illustrating an operation of the wavelength-tunable laser system according to the third exemplary embodiment of the present invention.

Fourth Exemplary Embodiment

Figure 11:
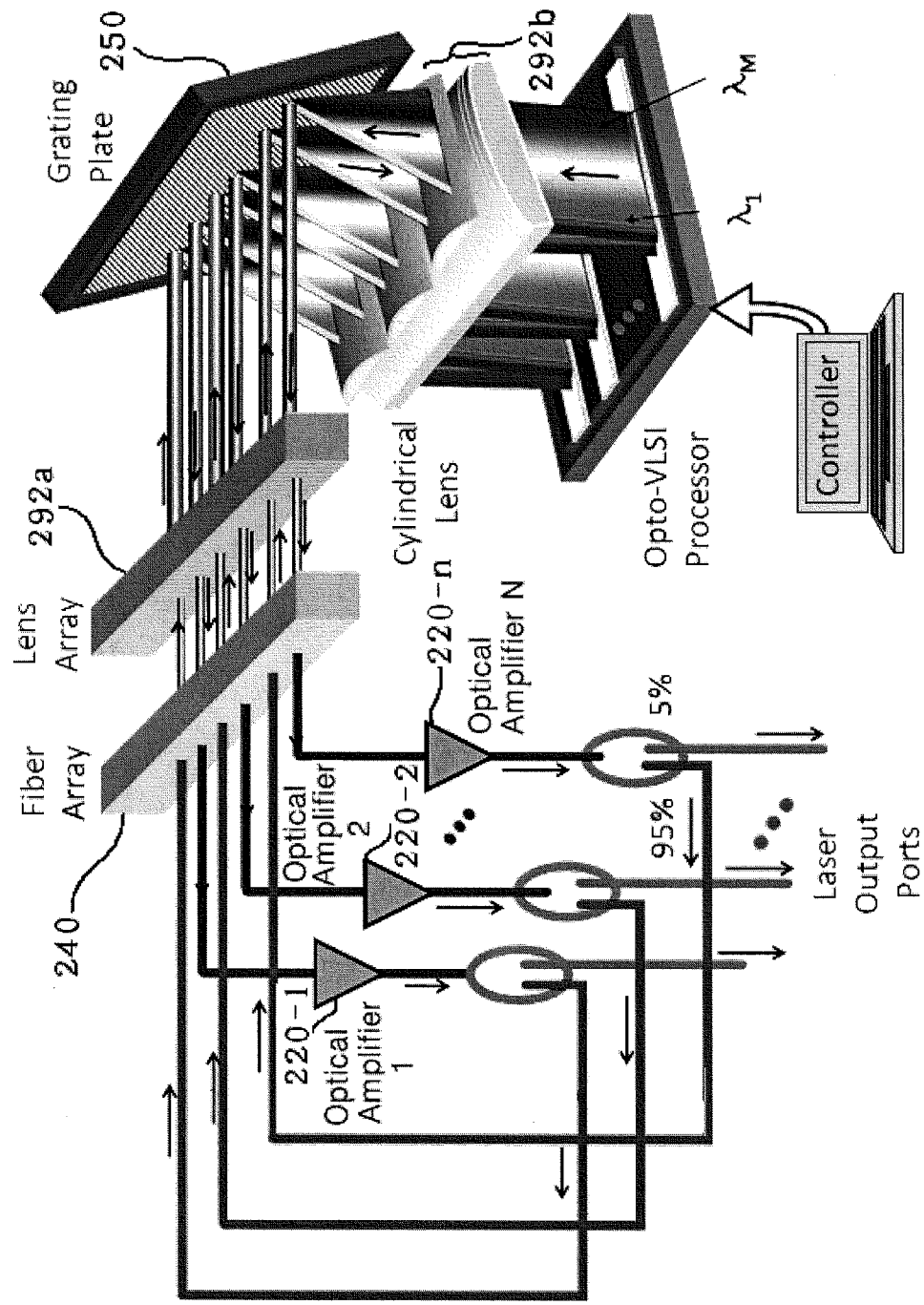
FIG. 11 is a schematic configuration diagram showing a wavelength-tunable laser system according to a fourth exemplary embodiment of the present invention.

FIG. 11 is a schematic configuration diagram showing a wavelength-tunable laser system according to a fourth exemplary embodiment of the present invention. In the fourth exemplary embodiment, components different from those of the first exemplary embodiment will be mainly described. The description of the same components should be substituted with that of the first exemplary embodiment.

The wavelength-tunable laser system includes an optical spectrum analyzer 210, optical amplifiers 220-1, . . . , 220-n, optical couplers 180-1, . . . , 180-n, an optical fiber collimator array 240, a diffraction grating plate 250, and an Opto-VLSI processor 260.

The optical fiber collimator array 240 is configured to have two ports (ports A and B) for each of the optical amplifiers 220-1, . . . , 220-n and each of the optical couplers 180-1, . . . , 180-n corresponding to the optical amplifiers 220-1, . . . , 220-n. The optical fiber collimator array is connected to one port (port A) according to an incident direction of light and one of the optical amplifiers 220-1, . . . , 220-n is connected to another port (port B). On the other hand, each port has a function of transferring light in one direction because light incident from each of the optical amplifiers 220-1, . . . , 220-n, is coupled and transmitted to another port. This is different from the second exemplary embodiment and the third exemplary embodiment. The structure of this exemplary embodiment is similar to that of the first exemplary embodiment.

Referring to FIG. 11, a lens 292a of an optical fiber collimator array-like structure corresponding to each port of the optical fiber collimator array is provided between the optical fiber collimator array 240 and the diffraction grating plate 250. A lens system 292b is configured to cause light incident between the diffraction grating plate 250 and the Opto-VLSI processor 260 to sequentially pass through a plurality of cylindrical lenses and an integrated cylindrical lens.

Figure 12:
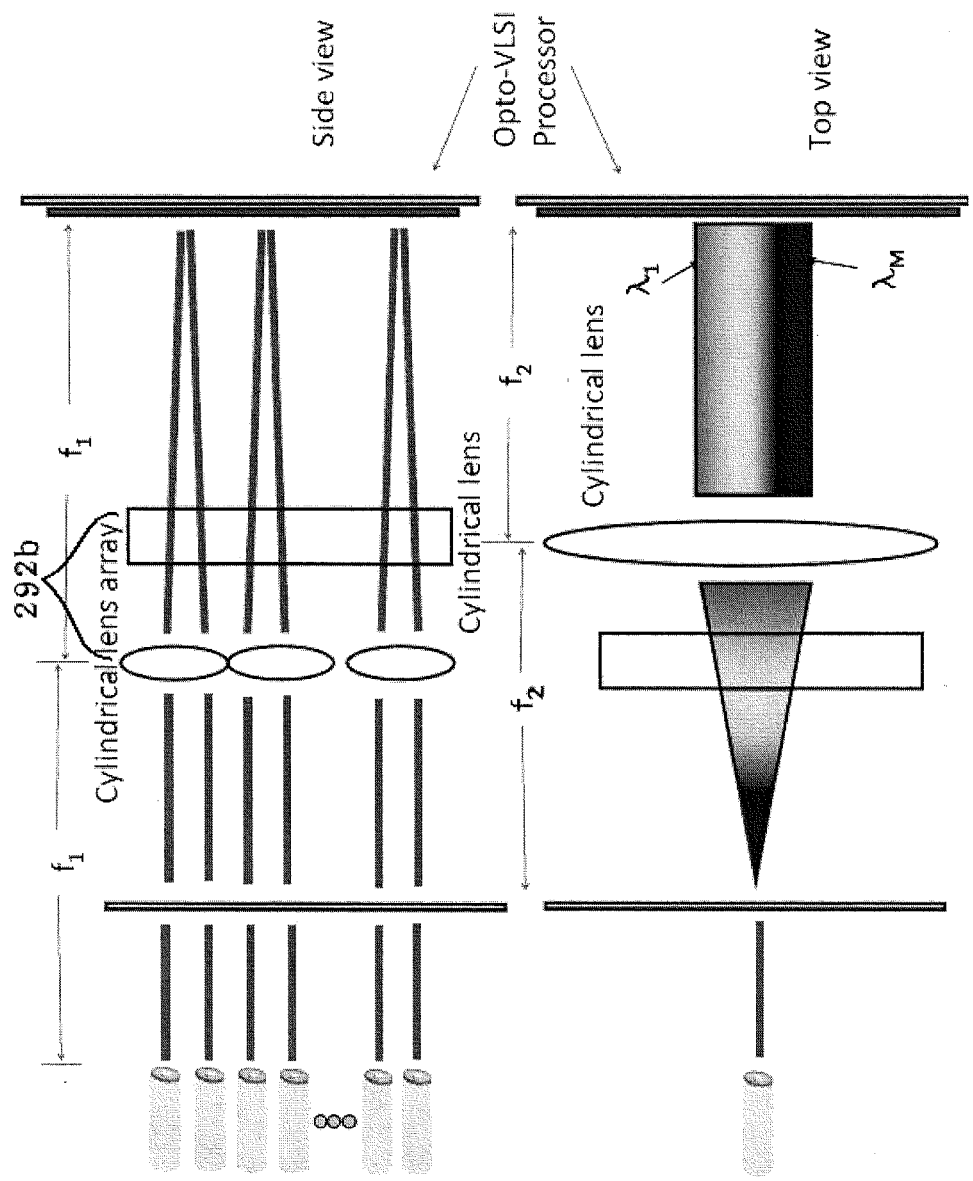
FIG. 12 is a diagram illustrating an operation of the wavelength-tunable laser system by a structure of FIG. 11.

FIG. 12 is a diagram illustrating an operation of the wavelength-tunable laser system by a structure of FIG. 11.

Figure 13:
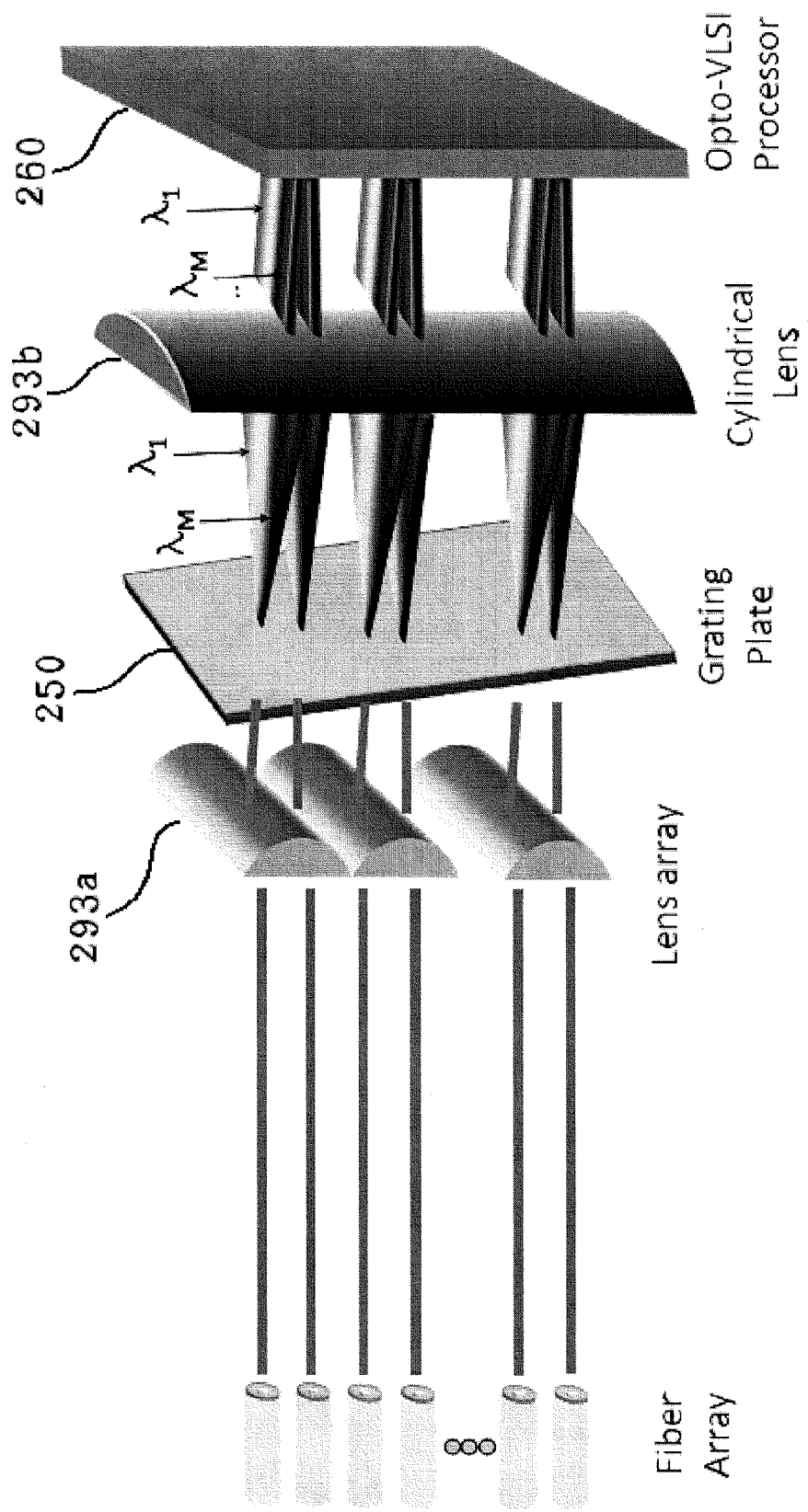
FIG. 13 is a diagram showing a modified example of the structure of FIG. 11 according to one or more embodiments of the present invention.

On the other hand, FIG. 13 is a diagram showing a modified example of the structure of FIG. 11 according to one or more embodiments of the present invention. In FIG. 11, the lens system is configured to cause light incident between the diffraction grating plate and the Opto-VLSI processor to sequentially pass through the plurality of cylindrical lenses and the integrated cylindrical lens. On the other hand, in FIG. 13, a plurality of cylindrical lenses 293a provided between the optical fiber collimator array and the diffraction grating plate are illustrated. In this case, a lens of the optical fiber collimator array-like structure may be applied in correspondence with each port of the optical fiber collimator array between the optical fiber collimator array and the diffraction grating plate, or may be excluded.

Fifth Exemplary Embodiment

Figure 14:
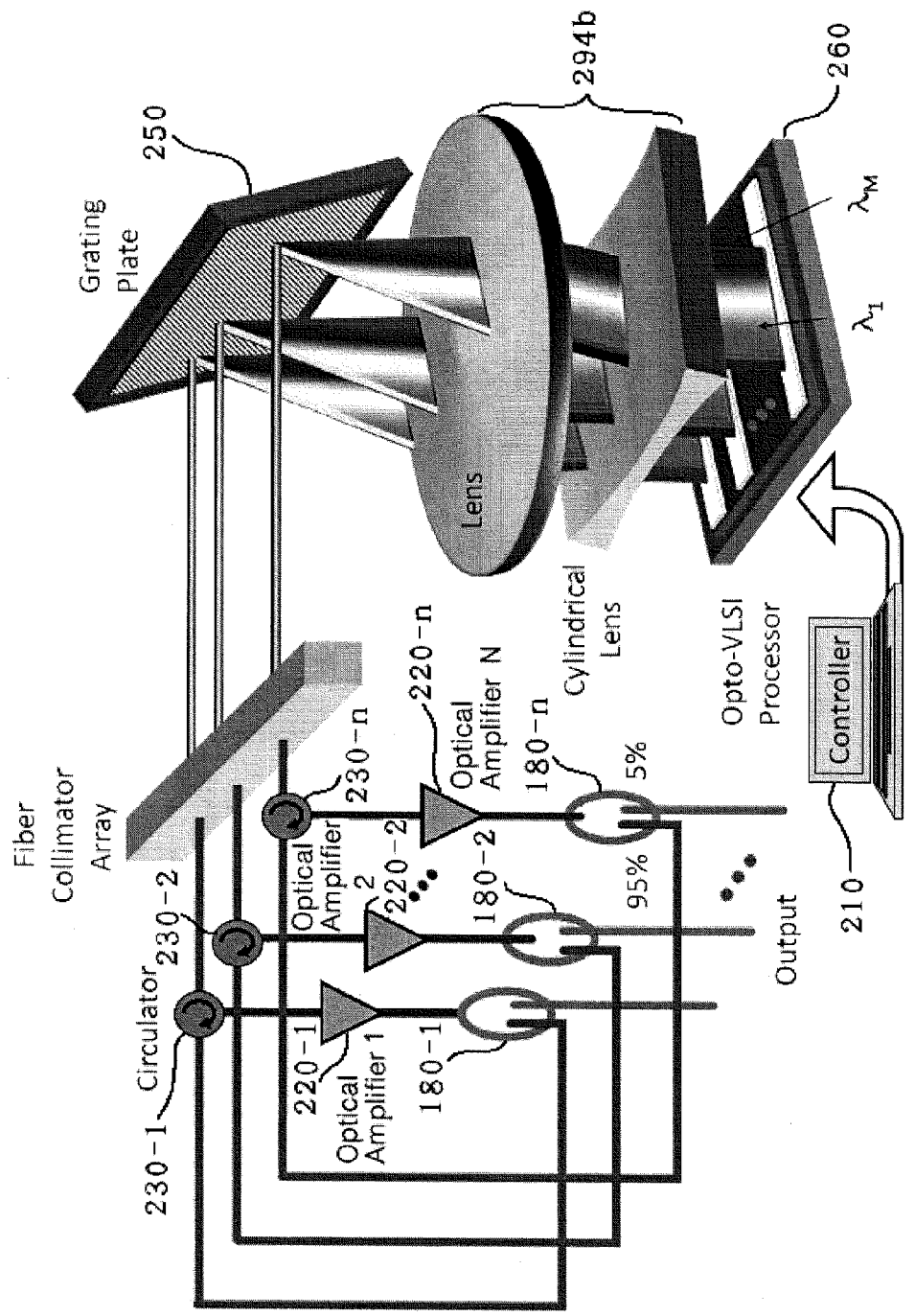
FIG. 14 is a schematic configuration diagram showing a wavelength-tunable laser system according to a fifth exemplary embodiment of the present invention.

FIG. 14 is a schematic configuration diagram showing a wavelength-tunable laser system according to a fifth exemplary embodiment of the present invention. In the fifth exemplary embodiment, components different from those of the second exemplary embodiment will be mainly described. The description of the same components should be substituted with that of the first exemplary embodiment.

Referring to FIG. 14, the wavelength-tunable laser system includes an optical spectrum analyzer 210, optical amplifiers 220-1, . . . , 220-n, optical couplers 180-1, . . . , 180-n, an optical fiber collimator array 240, a diffraction grating plate 250, and an Opto-VLSI processor 260. According to this exemplary embodiment, optical circulators 230-1, . . . , 230-n are disposed in correspondence with ports 240-1, . . . , 240-n of the optical fiber collimator array 240, and the optical circulators 230-1, . . . , 230-n are respectively connected to the optical amplifiers 220-1, . . . , 220-n.

A lens system 294b having a structure in which concave and convex lenses are combined is configured between the diffraction grating plate 250 and the Opto-VLSI processor 260.

Figure 15:
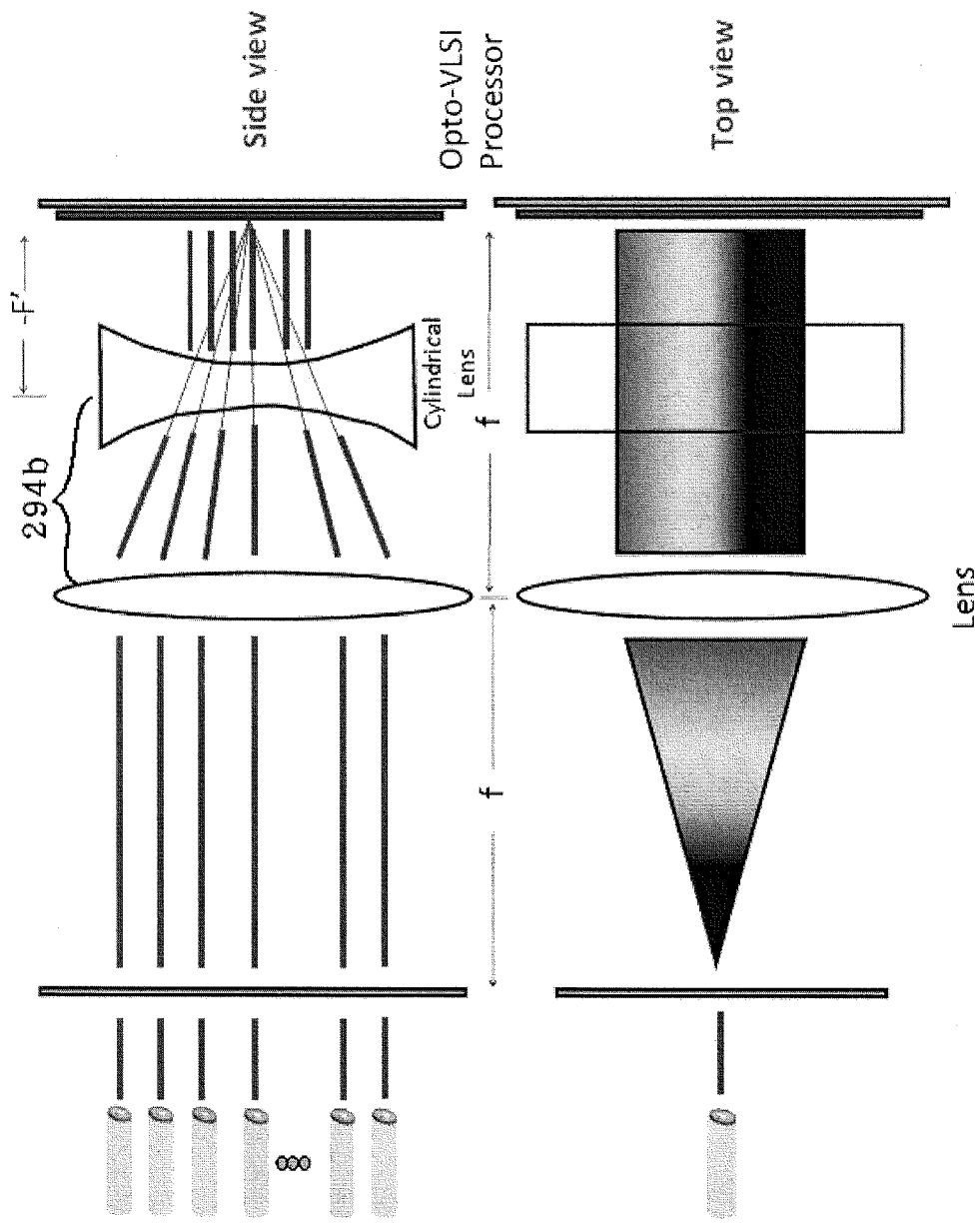
FIGS. 15 and 16 are side and top views illustrating an operation of the wavelength-tunable laser system according to the fifth exemplary embodiment of the present invention.
Figure 16:
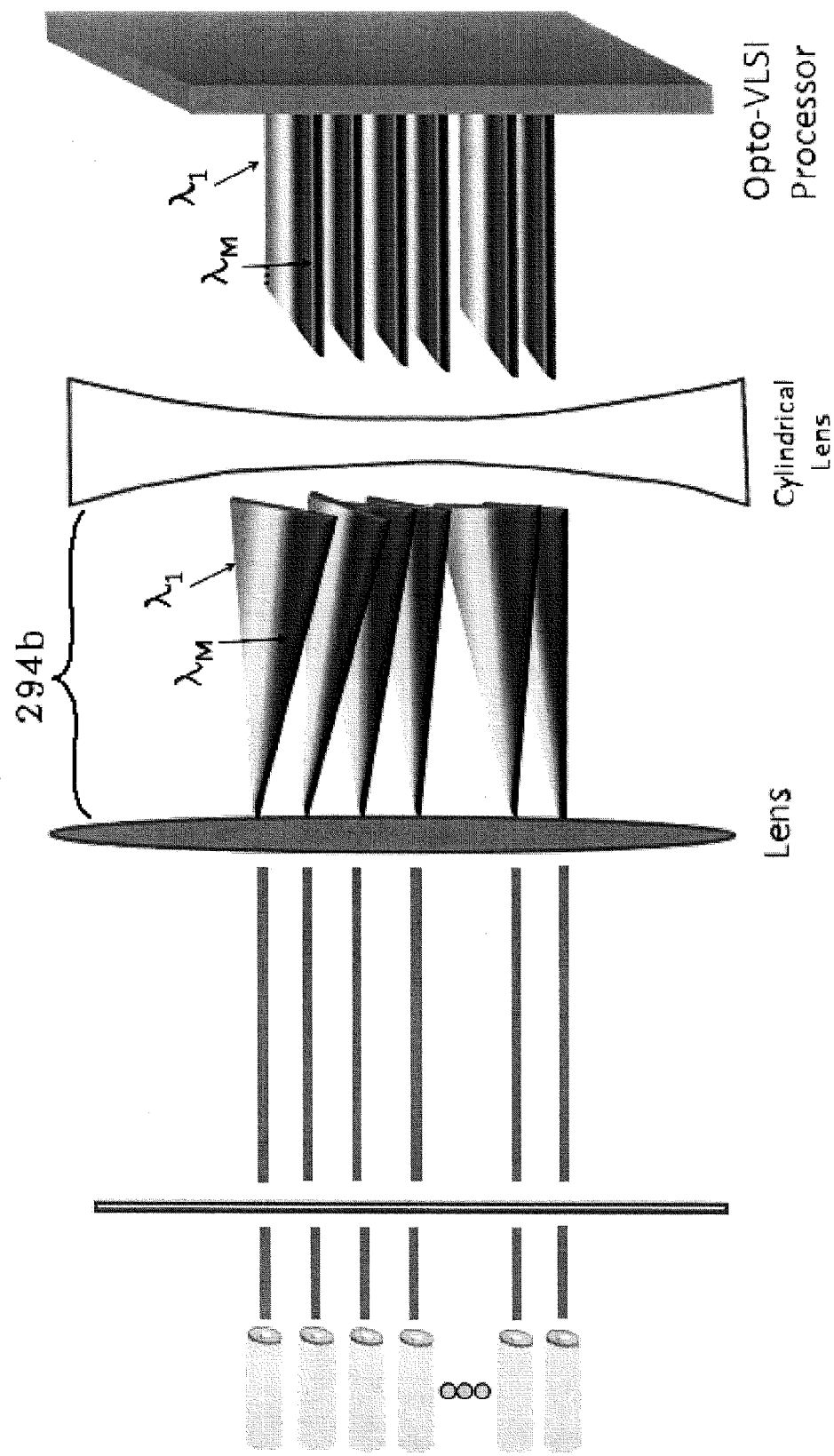

FIGS. 15 and 16 are side and top views illustrating an operation of the wavelength-tunable laser system according to the fifth exemplary embodiment of the present invention.

Figure 17:
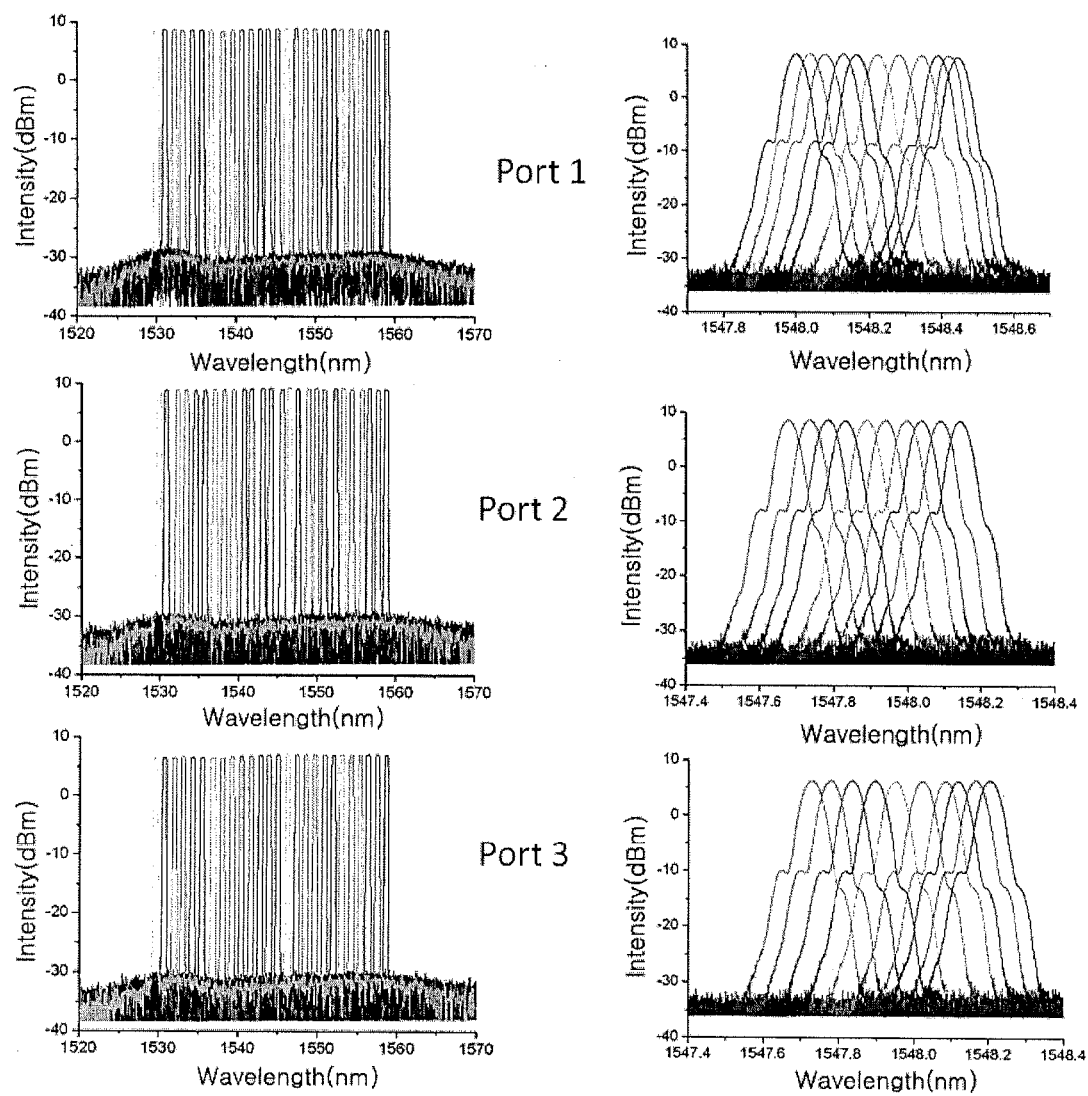
FIG. 17 is diagrams showing results of other experimental examples according to one or more embodiments of the present invention.

FIG. 17 is diagrams showing results of other experimental examples according to one or more embodiments of the present invention.

FIG. 17 illustrates an example in which each laser port may have one or more output laser signals in an optical fiber collimator array structure of three ports, and their wavelengths and power levels may be set by applying a phase hologram by the Opto-VLSI processor. It is possible to change a power level of each wavelength by changing a magnitude of an electric current that drives an associated optical amplifier.

According to one or more embodiments of the present invention, because wavelength tuning by a very simple configuration using an SOA and an Opto-VLSI processor is possible, cost-effective and small-size manufacturing is possible. Wavelength tuning can be performed with high precision by emitting only light of a specific wavelength through the Opto-VLSI processor.

A wavelength-tunable laser system according to one or more embodiments of the present invention can achieve a wavelength tuning step with a linewidth of about 0.05 nm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wavelength-tunable laser system, comprising:
    an optical fiber collimator array comprising at least two ports;
    an optical amplifier connected to one port of the optical fiber collimator array;
    an optical coupler that couples light incident from the optical amplifier and transmits the coupled light to another port;
    a diffraction grating plate that guides each wavelength component of light incident from the optical fiber collimator array in a different direction; and
    an Opto-Very Large Scale Integration (Opto-VLSI) processor that feeds back light of a specific wavelength among guided wavelength components to the optical amplifier and forms a desired hologram pattern by applying an electric current through a data decoder and an address decoder.

2. The wavelength-tunable laser system of claim 1, further comprising:
    a polarization controller provided between the other port and the optical coupler.

3. The wavelength-tunable laser system of claim 1, further comprising:
    a lens provided between the optical fiber collimator array and the diffraction grating plate.

4. The wavelength-tunable laser system of claim 1, further comprising:
    a lens provided between the diffraction grating plate and the Opto-VLSI processor.

5. The wavelength-tunable laser system of claim 4, wherein the lens comprises a plurality of cylindrical lenses and an integrated cylindrical lens.

6. The wavelength-tunable laser system of claim 1, further comprising:
    a plurality of cylindrical lenses provided between the optical fiber collimator array and the diffraction grating plate; and
    an integrated cylindrical lens provided between the diffraction grating plate and the Opto-VLSI processor.

7. A wavelength-tunable laser system, comprising:
    an optical fiber collimator array comprising at least one port;
    an optical amplifier connected to one port of the optical fiber collimator array;
    an optical coupler that couples and retransmits light incident from the optical amplifier;
    an optical circulator that transfers light incident from the optical fiber collimator array to the optical amplifier and transfers light from the optical coupler to the optical fiber collimator array;
    a diffraction grating plate that guides each wavelength component of the light incident from the optical fiber collimator array in a different direction; and
    an Opto-VLSI processor that feeds back light of a specific wavelength among guided wavelength components to the optical amplifier and forms a desired hologram pattern by applying an electric current through a data decoder and an address decoder.

8. The wavelength-tunable laser system of claim 7, further comprising:
    a first lens provided between the optical fiber collimator array and the diffraction grating plate; and
    a second lens provided between the diffraction grating plate and the Opto-VLSI processor.

9. The wavelength-tunable laser system of claim 7, further comprising:
    a lens provided between the diffraction grating plate and the Opto-VLSI processor.

10. The wavelength-tunable laser system of claim 9, wherein the lens is a cylindrical lens.

11. The wavelength-tunable laser system of claim 9, wherein the lens has a structure in which a concave lens and a convex lens are combined.

12. The wavelength-tunable laser system of claim 1, or wherein the optical amplifier is a semiconductor optical amplifier (SOA) using a semiconductor medium or a rare earth element-doped fiber amplifier such as an erbium-doped fiber amplifier.

13. The wavelength-tunable laser system of claim 7, further comprising:
    a lens provided between the optical fiber collimator array and the diffraction grating plate.

14. The wavelength-tunable laser system of claim 13, wherein the lens is an optical fiber collimator array-like structure corresponding to each port.

15. The wavelength-tunable laser system of claim 7, wherein the optical amplifier is a semiconductor optical amplifier (SOA) using a semiconductor medium or a rare earth element-doped fiber amplifier such as an erbium-doped fiber amplifier.

16. The wavelength-tunable laser system of claim 1, wherein the optical amplifier is a semiconductor optical amplifier (SOA) using an erbium-doped fiber amplifier.

17. The wavelength-tunable laser system of claim 7, wherein the optical amplifier is a semiconductor optical amplifier (SOA) using an erbium-doped fiber amplifier.

* * * * *